United States Patent
Mao et al.

(10) Patent No.: US 8,880,605 B2
(45) Date of Patent: Nov. 4, 2014

(54) BROWSER BASED WEB CONFERENCING EMPLOYING ATTENDEE SIDE IMAGE SCALING

(75) Inventors: Chengjiang Mao, San Jose, CA (US); Yanlin Guan, Santa Clara, CA (US); Sachin Guatam Kosare, Pune (IN); Bruce Thomas Maigatter, Santa Clara, CA (US)

(73) Assignee: RHUB Communications, San Jose, CA (US)

( * ) Notice: Subject to any disclaimer, the term of this patent is extended or adjusted under 35 U.S.C. 154(b) by 231 days.

(21) Appl. No.: 13/534,360

(22) Filed: Jun. 27, 2012

(65) Prior Publication Data

US 2014/0006488 A1    Jan. 2, 2014

(51) Int. Cl.
*G06F 15/16* (2006.01)

(52) U.S. Cl.
USPC .......................................................... 709/204

(58) Field of Classification Search
CPC ................ G06F 17/30247; G06F 3/14; G06F 2203/04806; H04L 63/168; G06Q 30/0643
USPC .......................................................... 709/204
See application file for complete search history.

(56) References Cited

U.S. PATENT DOCUMENTS

| | | | |
|---|---|---|---|
| 5,491,780 A | 2/1996 | Fyles et al. | |
| 6,978,418 B1 * | 12/2005 | Bain et al. | 715/205 |
| 8,031,972 B2 * | 10/2011 | Bhakta et al. | 382/298 |
| 2002/0038346 A1 | 3/2002 | Morrison et al. | |
| 2002/0054044 A1 | 5/2002 | Lu et al. | |
| 2004/0227900 A1 * | 11/2004 | Sato et al. | 353/30 |
| 2006/0031779 A1 | 2/2006 | Theurer et al. | |
| 2007/0214431 A1 * | 9/2007 | Amadio et al. | 715/788 |
| 2007/0283247 A1 * | 12/2007 | Brenneman et al. | 715/513 |
| 2011/0231746 A1 * | 9/2011 | Rohrabaugh et al. | 715/205 |
| 2013/0201209 A1 * | 8/2013 | Findlay et al. | 345/629 |

OTHER PUBLICATIONS

"Web and Video Conferencing Reaches a New Level of Effectiveness", PRWeb Press Release NEWWIRE, Mar. 8, 2006, http://www.prweb.com/releases/2006/3/prweb355283.htm.

Mike Heck, "Exclusive: Genesys caters enterprise-friendly meetings", InfoWorld, Nov. 9, 2006, http://www.infoworld.com/article/06/11/09/46TCgenesys_1.html.

* cited by examiner

*Primary Examiner* — Kevin Bates
*Assistant Examiner* — Sm Rahman
(74) *Attorney, Agent, or Firm* — Howard Sheerin

(57) ABSTRACT

A browser based web conferencing method is disclosed, the method comprising transmitting browser code to a browser of an attendee computer connected to a network. The browser code comprises code segments for receiving image size information from a server, wherein the image size information identifies a size of a presenter display area of a presenter computer. An image is received from the presenter computer through the server, a size of an attendee display area of the attendee computer is determined, and the image is scaled to generate a scaled image that fits in the attendee display area.

16 Claims, 6 Drawing Sheets

PRESENTER

ATTENDEE

```
// a. Get the entire desktop size:
   int iScreenX = GetSystemMetrics(SM_XVIRTUALSCREEN);
   int iScreenY = GetSystemMetrics(SM_YVIRTUALSCREEN);

// b. Get the displayed application window size
RECT tRect;
GetWindowRect(m_hSharedWindow, &tRect);
 // Where m_hSharedWindow is the displayed application window handle:
```

FIG. 6A

```
if (uVDelta->m_uDelta.m_bIsStill)
{
    // presenter display area changes now.

// tell the attendee browser to update the presenter display area width
    sOutput = sOutput + " iImageWidth = " +
       Utility::IntToString(m_uPresenterScreenSetting.m_iViewportWidth) + ";";

// tell the attendee browser to update the presenter display area height
    sOutput = sOutput + " iImageHeight = " +
       Utility::IntToString(m_uPresenterScreenSetting.m_iViewportHeight) + ";";

// call the attendee browser to scale the presenter display area image
    sOutput = sOutput + " Update(\"Server\");";
}
```

FIG. 6B

```
<script>
var iImageWidth = 0;
var iImageHeight = 0;
var oTopFrame = window.parent.frames[0].document;

function Update(sAction)
{
   var iWidthZoomValue;
   var iHeightZoomValue;
   var iZoomValue;
   var iWindowInnerWidth = $(window).innerWidth() || window.innerWidth ;
   var iWindowInnerHeight = $(window).innerHeight() || window.innerHeight ;

if (iImageWidth <= iWindowInnerWidth)
   {
       iWidthZoomValue = 1; // Zoom 100%, no zooming required
   }
   if (iImageWidth > iWindowInnerWidth)
   {
       iWidthZoomValue = iWindowInnerWidth / iImageWidth;
   } if (iImageHeight <= iWindowInnerHeight)
   {
       iHeightZoomValue = 1; // Zoom 100%, no zooming required
   }
   if (iImageHeight > iWindowInnerHeight)
   {
       iHeightZoomValue = iWindowInnerHeight / iImageHeight;
   } if (iWidthZoomValue > iHeightZoomValue)
   {
       iZoomValue = iHeightZoomValue;
   }
   else
   {
       iZoomValue = iWidthZoomValue;
   } body").css("background-color","#000");
       $("body").css("zoom",iZoomValue);
       $("body").css("-moz-transform","scale("+iZoomValue+")"); // For FireFox
       $("body").css("-moz-transform-origin","0 0"); // For FireFox
}
</script>
```

FIG. 6C

BROWSER BASED WEB CONFERENCING EMPLOYING ATTENDEE SIDE IMAGE SCALING

BACKGROUND

Web conferencing can be implemented by screen sharing a presenter's screen with attendees over the Internet. Various techniques have been disclosed to implement the screen sharing aspect, such as with a plug-in (e.g., Flash) that augments the basic operation of a web browser (e.g., Internet Explorer, Safari, Firefox, etc.). However, if the plug-in is not pre-installed on an attendee's computer, an attendee typically must download and install the plug-in before joining a meeting. Downloading a plug-in increases the setup time and complexity for an attendee to join a meeting. In addition, the attendee's computer (or gateway server) may have firewall software installed that may inhibit or further complicate the download and installation of the plug-in. Yet another problem is that an attendee may be hesitant to download and install a plug-in for fear of downloading a virus.

An alternative technique employs the basic functionality of a browser to implement screen sharing (browser based web conferencing) which obviates the need to download a plug-in. Thus, any attendee with an appropriate browser installed can join a meeting by simply launching the browser and visiting the designated web site.

BRIEF DESCRIPTION OF THE DRAWINGS

FIG. 6A shows code segments executed by the presenter computer for determining a size of the presenter display area according to an embodiment of the present invention.

FIG. 6B shows code segments executed by the server for transmitting size information of the presenter display area to the attendee computer according to an embodiment of the present invention.

FIG. 6C shows code segments executed by the browser of the attendee computer for scaling the presenter image using a browser zoom procedure with a scale factor as an input parameter.

DETAILED DESCRIPTION

Figure 1A:
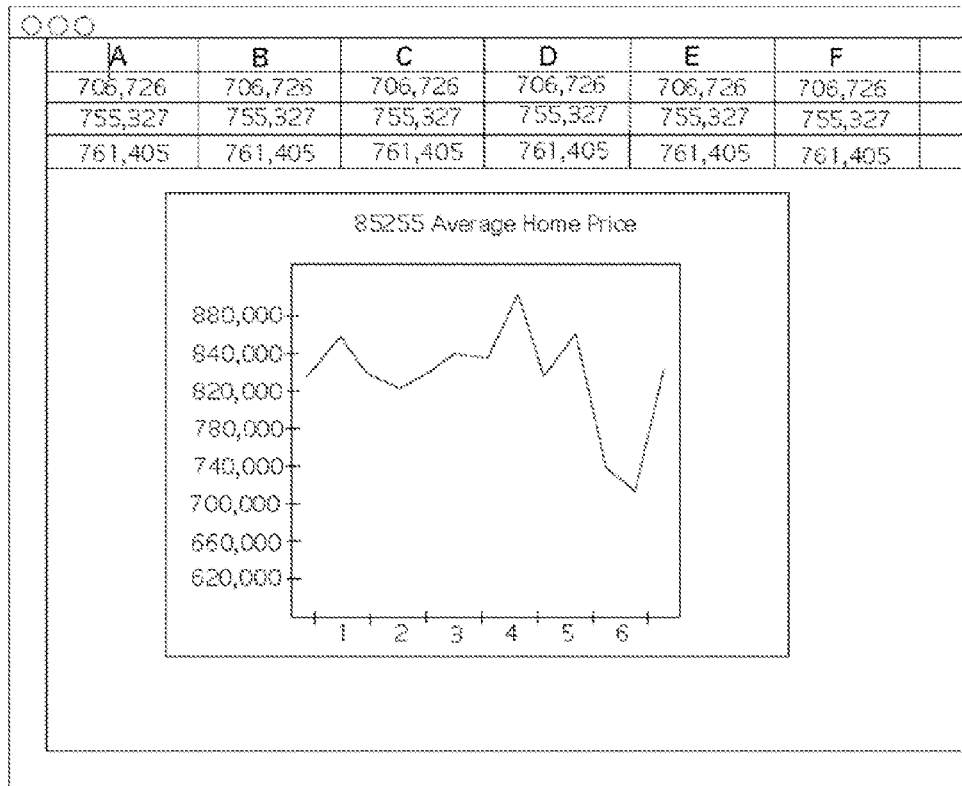
FIG. 1A shows a screen shot of a presenter computer in a prior art browser based web conferencing system.
Figure 1B:
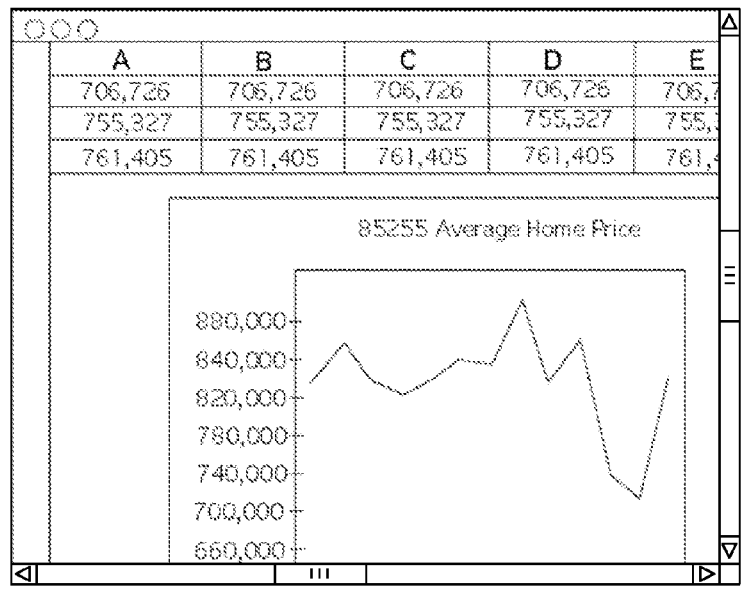
FIG. 1B shows a screen shot of an attendee computer in a prior art browser based web conferencing system, wherein the image received from the presenter is cropped from the attendee's view.

FIG. 1A shows a screen shot of a presenter computer in a prior art browser based web conferencing system. The presenter display area comprises an application window which is converted into an image that is transmitted to an attendee computer through a server over a suitable network (e.g., the Internet). FIG. 1B shows a screen shot of an attendee computer displaying the image received from the presenter computer, wherein the image is displayed in a window of a browser application. As seen in FIG. 1B, the image may be cropped if, for example, the window of the browser is smaller than the image received from the presenter computer (i.e., smaller than the display area of the presenter computer). The user of the attendee computer is therefore required to scroll the image left/right or up/down in order to view other parts of the image, or the user may increase the size of the browser window in order to see more of the image. However, in some cases the maximum size of the browser window may be constrained by the size of the attendee's computer screen; for example, if the presenter computer comprises a desktop computer and the attendee computer comprises a smaller laptop or tablet computer.

Figure 2A:
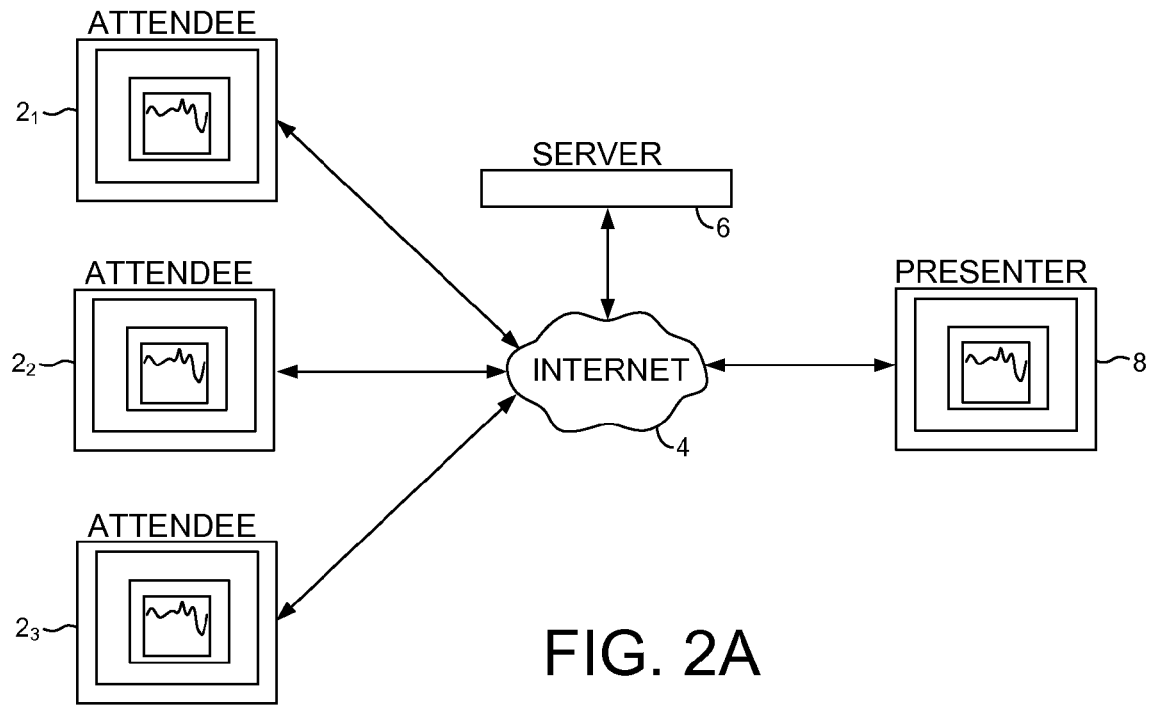
FIG. 2A shows an embodiment of the present invention wherein a server facilitates a browser based web conferencing method, including to transmit browser code to a browser of an attendee computer connected to a network.
Figure 2B:
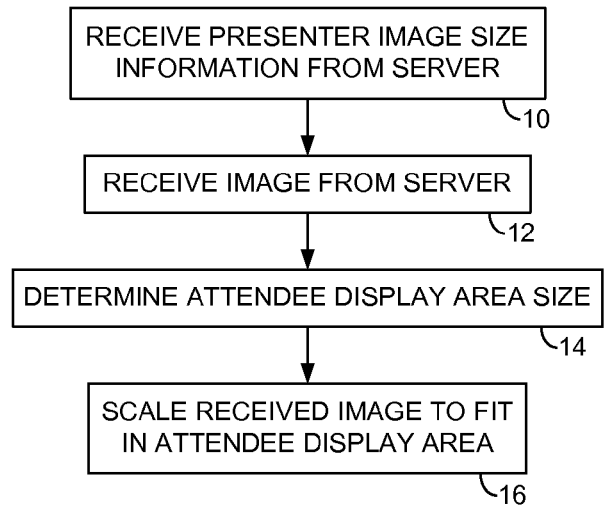
FIG. 2B is a flow diagram executed by the attendee computer according to an embodiment of the present invention wherein an image received from the presenter through the server is scaled to fit in a display area of the attendee computer.

FIG. 2A illustrates a browser based web conferencing method according to an embodiment of the present invention, wherein the method comprises transmitting browser code to a browser of an attendee computer $2_i$ connected to a network (e.g., the Internet 4). The browser code comprises code segments for performing the flow diagram shown in FIG. 2B, wherein image size information is received from a server 6 that identifies a size of a presenter display area of a presenter computer (step 10). An image is received from the presenter computer through the server (step 12), a size of an attendee display area of the attendee computer is determined (step 14), and the image is scaled to generate a scaled image that fits in the attendee display area (step 16).

Figure 3A:
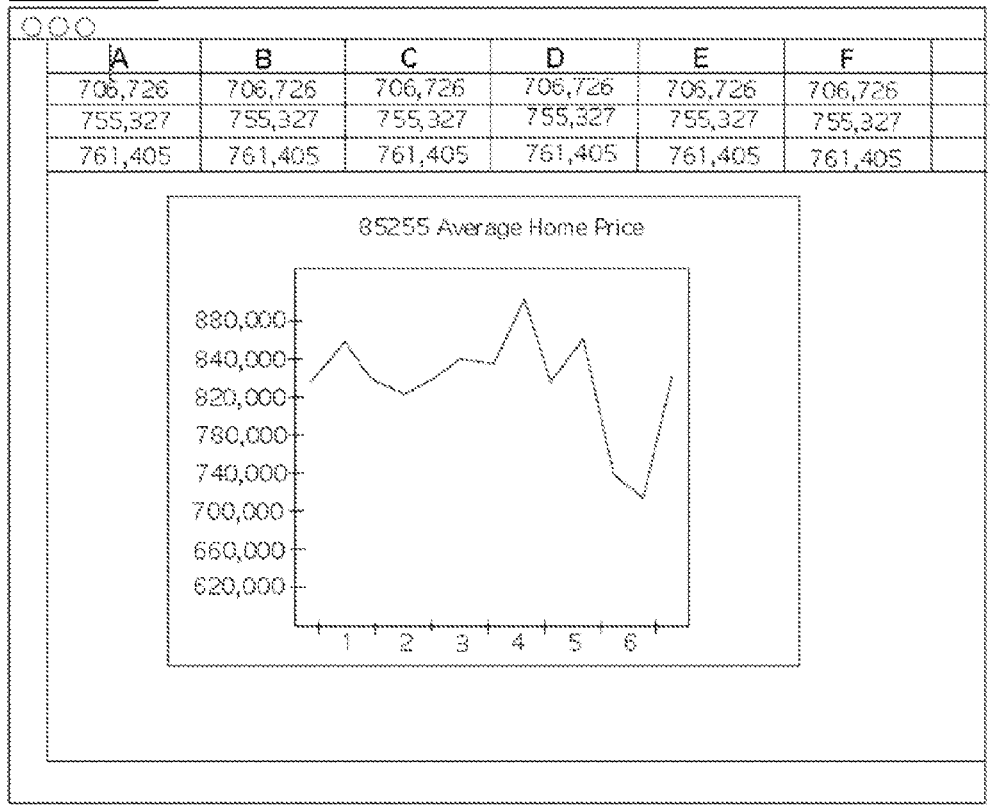
FIGS. 3A and 3B illustrate the scaling of a presenter image to fit in the display area of the attendee computer according to an embodiment of the present invention.
Figure 3B:
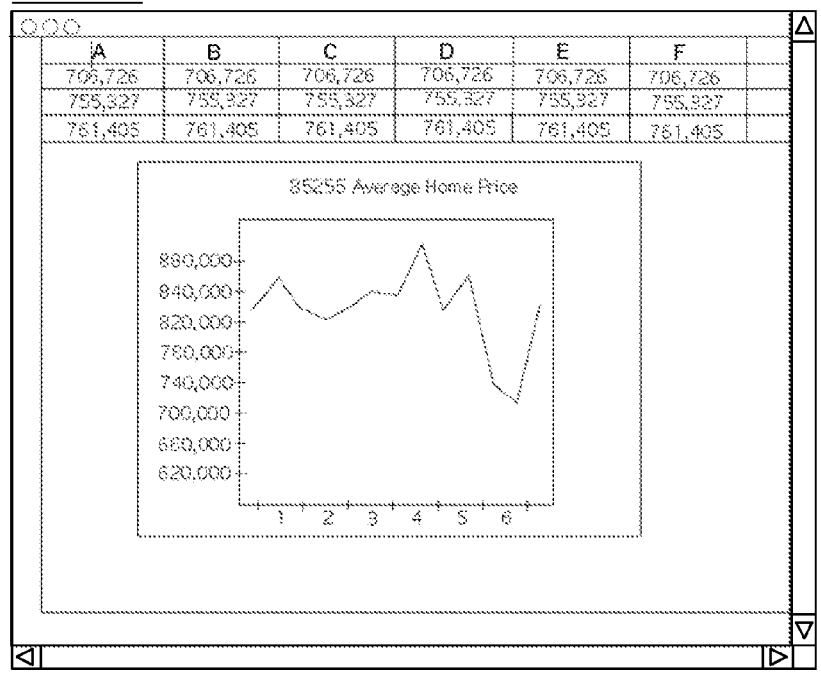

FIGS. 3A and 3B illustrate an example embodiment of the present invention wherein a display area of a presenter computer shown in FIG. 3A may comprise any suitable area, such as the entire desktop, one or more application windows, or a user selectable area (e.g., using a rectangle selection tool). The display area of the presenter computer 8 is converted into an image that is transmitted over the network (e.g., Internet 4) through the server 6 to the attendee computer $2_i$. A browser application running on the attendee computer $2_i$ scales the image to fit in the display area of the attendee computer (e.g., an application window of the browser). In this manner, the user of the attendee computer $2_i$ can view the entire image as shown in FIG. 3B without needing to scroll the image or increase the size of the browser window as in the prior technique described above with reference to FIG. 1B.

Figure 4:
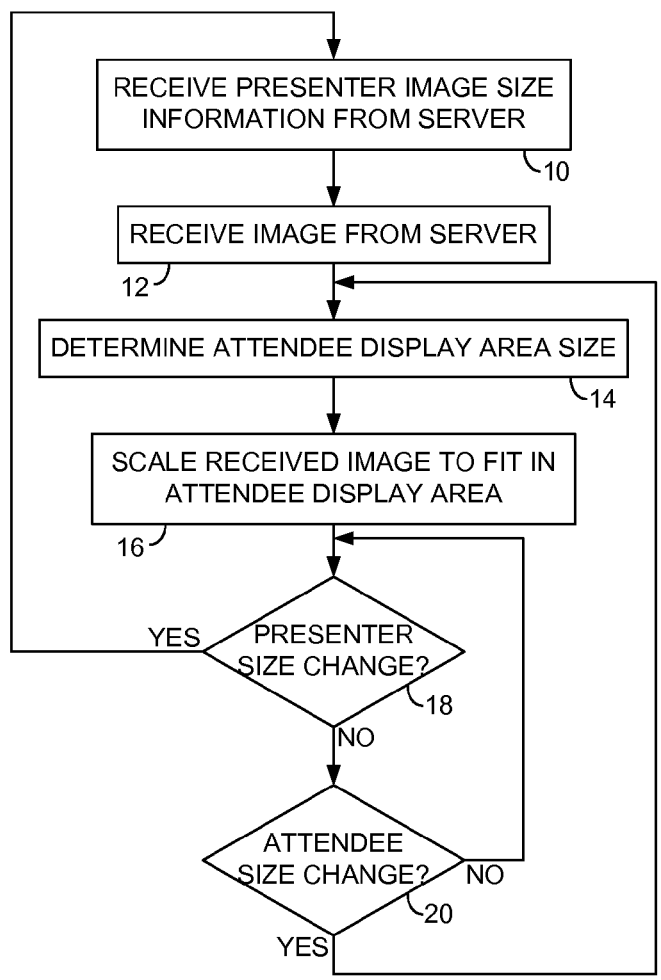
FIG. 4 is a flow diagram according to an embodiment of the present invention wherein a presenter image is rescaled when the size of the presenter display area changes or when the size of the attendee display area changes.

In one embodiment, the user of the presenter computer may change the size of the display area, for example, by changing from a window view to a desktop view, by changing the size of the current application window, by switching to a different application window, or by changing a user selectable display area. In addition, the user of the attendee computer may change the size of the display area, for example, by changing the size of the browser application window. FIG. 4 is a flow diagram which expands on the flow diagram of FIG. 2B, wherein in one embodiment when the user of the presenter computer changes the size of the display area (step 18), the flow diagram is re-executed starting from step 10 in order to receive an updated image which is scaled to fit in the browser application window of the attendee computer. If the user of the attendee computer changes the size of the display area (step 20), the flow diagram is re-executed starting from step 14 in order to determine the updated size of the display area and rescale the image being displayed.

Figure 5:
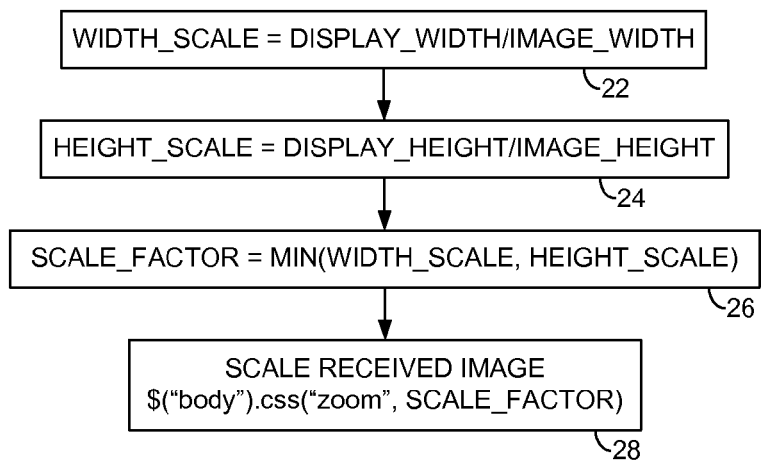
FIG. 5 is a flow diagram according to an embodiment of the present invention wherein the presenter image is scaled using a browser zoom procedure with a scale factor as an input parameter.

Any suitable technique may be employed in the embodiments of the present invention to scale the image by executing browser code at the attendee computer. The flow diagram of FIG. 5 illustrates an embodiment wherein a width scale is calculated by dividing the width of the display area of the attendee computer by the width of the presenter image (step 22). A height scale is calculated by dividing the height of the display area by the height of the presenter image (step 24), and a scale factor is generated by selecting the minimum of the width scale and the height scale (step 26). The width and height of the image and display area may be represented in any suitable units, such as pixels of a bit map. In one embodiment, the image is scaled by calling a suitable browser zoom procedure with the scale factor as an input parameter (step 28), wherein in the example shown in FIG. 5, the browser zoom procedure comprises a Cascading Style Sheet (CSS). The browser zoom procedure (e.g., CSS) automatically scales the image based on the scale factor, and then displays the scaled image in the browser application window.

Any suitable code segments may be employed to implement the embodiments of the present invention. FIG. 6A shows example Javascript code segments executed by the presenter computer for determining the size of the presenter display area. The first example code segment determines the size of the entire desktop, and the second example code segment determines the size of the active application window. In other embodiments, the presenter computer may execute suitable code segments that enables a user to select the display area, for example, using a rectangle selection tool. Once the size of the display area at the presenter computer 8 has been determined, the presenter computer 8 transmits the size information to the server 6 (FIG. 2A).

When the server 6 receives the initial size information from the presenter computer 8, or when the size information is updated (e.g., when the user at the presenter computer changes the display size), the server 6 provides the attendee computers $2_1$-$2_N$ with the initial or updated size information. The server 6 may execute any suitable code segments to provide the initial or updated size information to the attendee computers $2_1$-$2_N$, an example of which is shown in the Javascript code segments of FIG. 6B. In this example, the server 6 constructs an output string (sOutput) that comprises the image width and image height information, and then executes a call to the browsers at the attendee computers $2_1$-$2_N$ to perform the desired scaling of the image.

FIG. 6C shows example Javascript code segments executed by the browsers of the attendee computers $2_1$-$2_N$ for scaling the image to fit in the display area when notified by the server 6. In one embodiment, the code segments shown in FIG. 6C are transmitted from the server 6 to the attendee computers $2_1$-$2_N$ in any suitable format capable of being executed by a suitable browser (e.g., Internet Explorer, Safari, FireFox, etc.). In the example of FIG. 6C, the code segments are transmitted to the attendee computers $2_1$-$2_N$ as a suitable script (e.g., a Java script). The code segments shown in FIG. 6C compute a scale factor relative to the ratio of the width and height of the attendee computer display area and the image width and height as described above with reference to FIG. 4. The scale factor (iZoomValue) is then used as an input parameter to a browser zoom procedure (CSS procedure) that automatically performs the scaling operation.

In one embodiment, the code segments of the Update function shown in FIG. 6C may be executed when the attendee changes the size of their browser window (at step 20 of FIG. 4). An example Javascript code segment that may be used to detect a browser window resizing event at the attendee computer is:

```
window.onresize = function( )
{
    Update("");
}
```

The above window.onresize function is called automatically when the attendee changes the size of their browser window, thereby calling the Update function shown in FIG. 6C so that the image being displayed is automatically scaled to fit in the attendee's resized browser window.

Any suitable technique may be employed to transmit the size information for the display area of the presenter computer 8 to the attendee computers $2_1$-$2_N$. In the examples described above, the size information comprises explicit dimensions of the presenter display area (image size) that is ultimately transmitted to the attendee computers $2_1$-$2_N$. In another embodiment, the attendee computers $2_1$-$2_N$ may implicitly derive the size of the presenter display area by evaluating the received image sizes. For example, in one embodiment a number of images may be transmitted from the presenter computer to the attendee computers where the collection of images represents the size of the presenter display area. The attendee computers may derive the size of the presenter display area by tracking the maximum width and height of the combined images. That is, each image may be assigned an X, Y coordinate as well as a width and height (where the images might overlap). The maximum width and maximum height can be tracked based on the coordinates and dimensions of the received images, and then the scale factor computed accordingly. In one embodiment, the presenter computer may transmit a suitable message to the attendee computers (through the server) when the size of the presenter display area changes so that the attendee computers can reset the calculation of the width and height measurements based on the new images received.

The embodiments of the present invention may be implemented by code segments stored on any suitable computer readable storage medium. For example, the code segments may be stored on a disk of a disk drive, or any other suitable storage medium capable of being read and executed by a microprocessor. In one embodiment, the code segments may be stored temporarily in a volatile semiconductor memory, such as the code segments transmitted from the server 6 to the attendee computers $2_1$-$2_N$ (FIG. 2A) and executed by the browser during a web conferencing session. The attendee computers $2_1$-$2_N$ may comprise any suitable microprocessor for executing the code segments stored on the computer readable storage medium (received from the server 6), as well as code segments for executing the browser application.

Another embodiment of the present invention comprises a server 6 (FIG. 2A) including a microprocessor operable to execute server code segments for transmitting browser code to a browser of an attendee computer $2_i$ connected to a network (e.g., Internet 4). The browser code comprises code segments for performing the flow diagram shown in FIG. 2B, wherein image size information is received from a server 6 that identifies a size of a presenter display area of a presenter computer (step 10). An image is received from the presenter computer through the server (step 12), a size of an attendee display area of the attendee computer is determined (step 14), and the image is scaled to generate a scaled image that fits in the attendee display area (step 16).

What is claimed is:

1. A browser based web conferencing method, the method comprising transmitting browser code to a browser of an attendee computer connected to a network, the browser code comprising code segments for:
   receiving image size information from a server, wherein the image size information identifies a size of a presenter display area of a presenter computer;
   receiving a first image from the presenter through the server;
   determining a size of an attendee display area of the attendee computer;
   determining a first scale factor to scale the first image based on the size of the presenter display area and the size of the attendee display area; and
   scaling the first image using a browser zoom procedure with the first scale factor as an input parameter.

2. The method as recited in claim 1, wherein the browser code further comprises code segments for:
   receiving second image size information from the server when the size of the presenter display area changes;
   receiving a second image from the presenter through the server; and
   determining a second scale factor to scale the second image based on the size of the presenter display area and the size of the attendee display area; and
   scaling the second image using the browser zoom procedure with the second scale factor as an input parameter.

3. The method as recited in claim 1, wherein the browser code further comprises code segments for:
   determining that the size of the attendee display area has changed;
   determining a second scale factor to scale the second image based on the size of the presenter display area and the changed size of the attendee display area; and
   scaling the first image using the browser zoom procedure with the second scale factor as an input parameter.

4. The method as recited in claim 1, wherein the browser code further comprises code segments for:
   determining a width scale factor based on a width of the presenter display area relative to a width of the attendee display area;
   determining a height scale factor based on a height of the presenter display area relative to a height of the attendee display area; and
   determining the first scale factor based on the width scale factor and the height scale factor.

5. The method as recited in claim 4, wherein the browser code further comprises code segments for:
   selecting between the width scale factor and the height scale factor to generate the first scale factor.

6. The method as recited in claim 1, wherein the browser zoom procedure comprises a zoom property of a Cascading Style Sheet (CSS).

7. A non-transitory computer readable medium comprising code segments to be executed by a microprocessor, the code segments for:
   receiving image size information from a server, wherein the image size information identifies a size of a presenter display area of a presenter computer;
   receiving a first image from the presenter through the server;
   determining a size of an attendee display area of the attendee computer;
   determining a first scale factor to scale the first image based on the size of the presenter display area and the size of the attendee display area; and scaling the first image using a browser zoom procedure with the first scale factor as an input parameter.

8. The non-transitory computer readable medium as recited in claim 7, further comprising code segments for:
   receiving second image size information from the server when the size of the presenter display area changes;
   receiving a second image from the presenter through the server;
   determining a second scale factor to scale the second image based on the size of the presenter display area and the size of the attendee display area; and
   scaling the second image using the browser zoom procedure with the second scale factor as an input parameter.

9. The non-transitory computer readable medium as recited in claim 7, further comprising code segments for:
   determining that the size of the attendee display area has changed;
   determining a second scale factor to scale the second image based on the size of the presenter display area and the changed size of the attendee display area; and
   scaling the first image using the browser zoom procedure with the second scale factor as an input parameter.

10. The non-transitory computer readable medium as recited in claim 7, further comprising code segments for:
    determining a width scale factor based on a width of the presenter display area relative to a width of the attendee display area; determining a height scale factor based on a height of the presenter display area relative to a height of the attendee display area; and
    determining the first scale factor based on the width scale factor and the height scale factor.

11. The non-transitory computer readable medium as recited in claim 10, further comprising code segments for:
    selecting between the width scale factor and the height scale factor to generate the first scale factor.

12. The non-transitory computer readable medium as recited in claim 7, wherein the browser zoom procedure comprises a zoom property of a Cascading Style Sheet (CSS).

13. A server comprising a microprocessor operable to execute server code segments for transmitting browser code to a browser of an attendee computer connected to a network, the browser code comprising code segments for:
    receiving image size information from the server, wherein the image size information identifies a size of a presenter display area of a presenter computer;
    receiving a first image from the presenter through the server;
    determining a size of an attendee display area of the attendee computer; and
    determining a first scale factor to scale the first image based on the size of the presenter display area and the size of the attendee display area; and
    scaling the first image using a browser zoom procedure with the first scale factor as an input parameter.

14. The server as recited in claim 13, wherein the browser code further comprises code segments for:
    receiving second image size information from the server when the size of the presenter display area changes;
    receiving a second image from the presenter through the server;
    determining a second scale factor to scale the second image based on the size of the presenter display area and the size of the attendee display area; and
    scaling the second image using the browser zoom procedure with the second scale factor as an input parameter.

15. The server as recited in claim 13, wherein the browser code further comprises code segments for:

determining that the size of the attendee display area has changed;

determining a second scale factor to scale the second image based on the size of the presenter display area and the changed size of the attendee display area; and scaling the first image using the browser zoom procedure with the second scale factor as an input parameter.

16. The server as recited in claim 13, wherein the browser zoom procedure comprises a zoom property of a Cascading Style Sheet (CSS).

* * * * *